United States Patent [19]

Hara et al.

[11] Patent Number: 4,875,452
[45] Date of Patent: Oct. 24, 1989

[54] FUEL CONTROL APPARATUS FOR AN INTERNAL COMBUSTION ENGINE

[75] Inventors: Toshiro Hara; Takanori Fujimoto; Ikuo Musa, all of Himeji, Japan

[73] Assignee: Mitsubishi Denki Kabushiki Kaisha, Tokyo, Japan

[21] Appl. No.: 214,056

[22] Filed: Jun. 30, 1988

[30] Foreign Application Priority Data

Jul. 6, 1987 [JP] Japan ............................. 62-169084
Jul. 14, 1987 [JP] Japan ............................. 62-176291
Jul. 22, 1987 [JP] Japan ............................. 62-184154

[51] Int. Cl.$^4$ ................. F02D 41/18; F02D 41/06; F02M 51/00
[52] U.S. Cl. .................................. 123/488; 123/494; 123/491
[58] Field of Search ............... 123/478, 480, 179 L, 123/486, 489, 494, 488; 73/118.1, 118.2; 364/431.05, 510, 557

[56] References Cited

U.S. PATENT DOCUMENTS

| 4,562,814 | 1/1986 | Abo et al. ........................ 123/488 |
| 4,627,402 | 12/1986 | Saito et al. .................... 123/489 X |
| 4,721,087 | 1/1988 | Kanno et al. ................... 123/494 X |
| 4,724,816 | 2/1988 | Kanno et al. ................... 123/478 X |
| 4,760,829 | 8/1988 | Kanno et al. ................... 123/494 X |
| 4,777,919 | 10/1988 | Kanno et al. .................. 123/494 X |
| 4,817,573 | 4/1989 | Yamada et al. ..................... 123/494 |

FOREIGN PATENT DOCUMENTS

0053124 5/1976 Japan .

Primary Examiner—Willis R. Wolfe
Attorney, Agent, or Firm—Oblon, Spivak, McClelland, Maier & Neustadt

[57] ABSTRACT

A fuel control apparatus for an internal combustion engine comprises an crank angle sensor producing a crank angle signal at a predetermined crank angle in the engine, an intake air quantity detector for detecting the quantity of intake air sucked in the engine, an injector for injecting fuel to an engine cylinder, and a control means for actuating the injector at a driving time in response to the quantity of intake air and at a timing determined by the crank angle signal, wherein a period calculating means calculates the next period on the basis of the previous period and the present period in the crank angle signal and an injection-initiating time control means controls a time to actuate the injector in accordance with the next period of the crank angle signal.

5 Claims, 13 Drawing Sheets

FUEL CONTROL APPARATUS FOR AN INTERNAL COMBUSTION ENGINE

BACKGROUND OF THE INVENTION

1. Field of the Invention

The present invention relate to a fuel control apparatus for an internal combustion engine.

2. Discussion of Background

Figure 2:
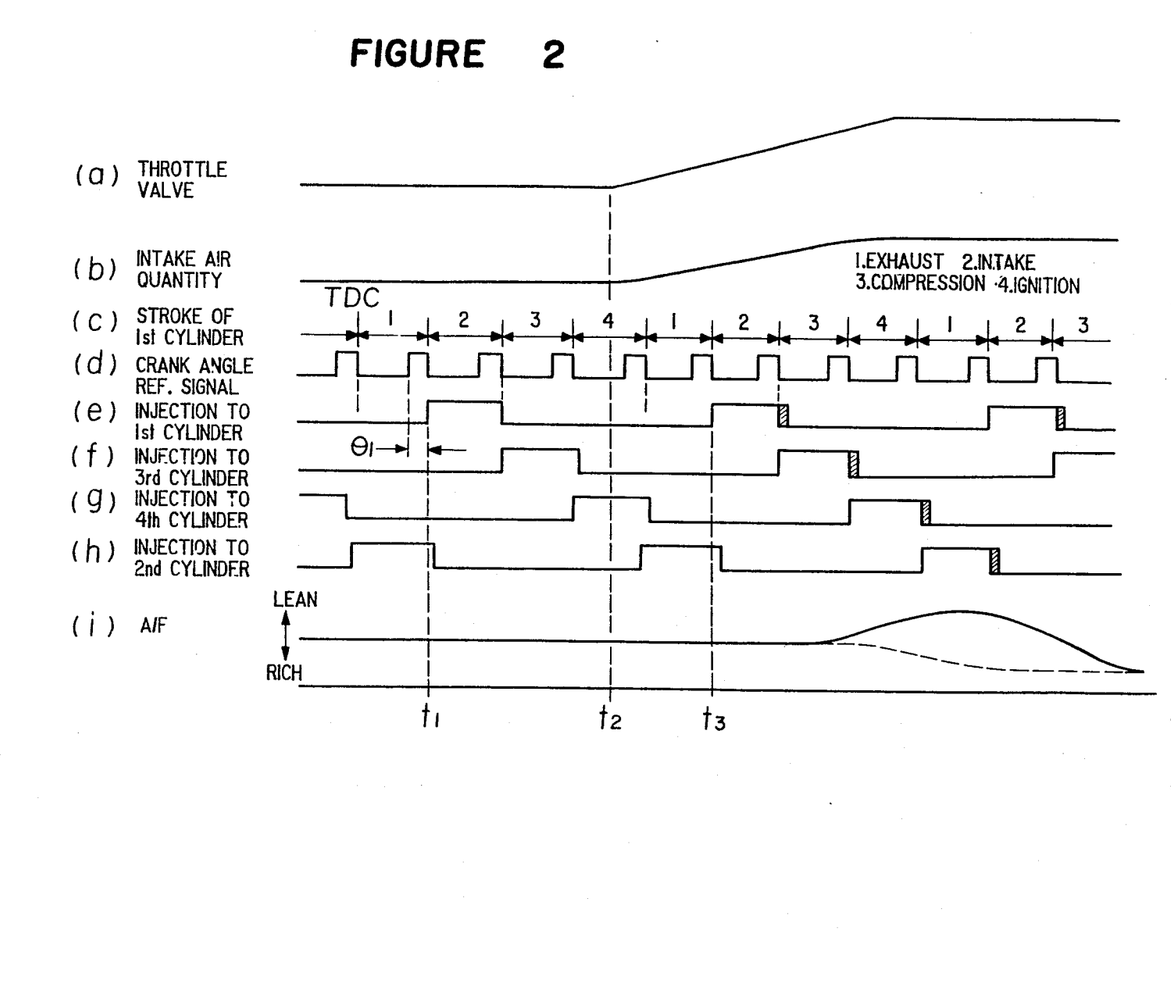
FIGS. 2, a–i are a timing chart showing the operation of a conventional fuel control apparatus.

FIG. 2 shows a timing chart for a conventional fuel control apparatus, wherein a character a represents the degree of opening of a throttle valve, a character b represents a quantity of intake air, a character c represents repeated strokes of exhaust, intake, compression and ignition for a first cylinder. The strokes of third, fourth and second cylinders are respectively behind one, two and three strokes with respect to the first cylinder although not shown in FIG. 2. A character d represents a crank angle reference signal, characters e–h respectively represent fuel injection timings for each of the cylinders, and a character i represents an air-fuel ratio A/F.

As apparent from the FIG. 2, fuel injection for each of the cylinders is carried out with a delay of a crank angle $\theta_1$ with respect to a rising time of the crank angle reference signal. However, when the automobile is accelerated, a time for each stroke in the cylinders is shortened and on the contrary, a time for injecting fuel is prolonged; accordingly, when the fuel injection is started with a delay of the crank angle $\theta_1$ from the rising time of the crank angle reference signal, the time of completion of the fuel injection is out of the range of an intake stroke of a cylinder with the result of reduction in a quantity of fuel to be injected, whereby the air-fuel ratio at the time of the acceleration becomes lean. This causes reduction in a torque in the engine to thereby decrease the acceleration.

SUMMARY OF THE INVENTION

It is an object of the present invention to provide a fuel control apparatus for an internal combustion engine in which a fuel injection is finished in an intake stroke even at the time of the acceleration of an automobile to thereby enable the engine to operate at an appropriate air-fuel ratio.

In accordance with the present invention, there is provided a fuel control apparatus for an internal combustion engine comprising an crank angle sensor producing a crank angle signal at a predetermined crank angle in said engine, an intake air quantity detecting means for detecting the quantity of intake air sucked in the engine, an injector for injecting fuel to an engine cylinder, and a control means for actuating the injector at a driving time in response to the quantity of intake air and at a timing determined by the crank angle signal, said fuel control apparatus being characterized by comprising a period calculating means for calculating the next period on the basis of the previous period and the present period in the crank angle signal and an injection-initiating time control means for controlling time to actuate the injector in accordance with the next period of the crank angle signal.

In accordance with another aspect of the present invention, there is provided a fuel control apparatus for an internal combustion engine comprising an crank angle sensor producing a crank angle signal at a predetermined crank angle in said engine, an intake air quantity detecting means for detecting the quantity of intake air sucked in the engine, an injector for injecting fuel to an engine cylinder, and a control means for actuating the injector at a driving time in response to the quantity of intake air and at a timing determined by the crank angle signal, said fuel control apparatus being characterized by comprising a period calculating means for calculating the next period on the basis of the previous period and the present period in the crank angle signal, a starting condition detecting means for detecting starting condition in the engine, and an injection-initiating time control means for controlling time to actuate the injector in synchronism with the crank angle signal in the time of starting the engine and in accordance with the next period of the crank angle signal in the time other than the starting time.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 4, A–D are flow charts showing the operation of the first embodiment of the present invention;

FIGS. 9, A–D are flow charts showing the operation of a second embodiment f the present invention;

FIGS. 12, A–D are flow charts showing the operation of the third embodiment of the present invention;

DETAILED DESCRIPTION OF PREFERRED EMBODIMENTS

In the following, preferred embodiments of the present invention will be described with reference to the drawings.

Figure 1:
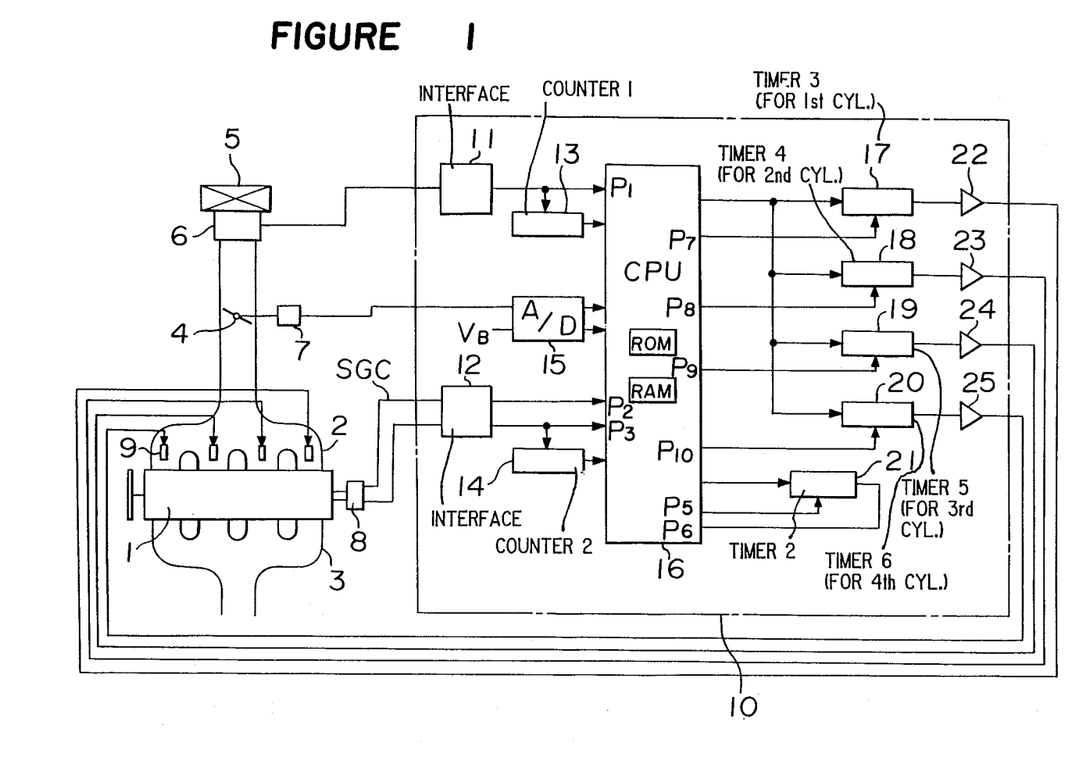
FIG. 1 is a diagram showing a first embodiment of the fuel control apparatus according to the present invention.

FIG. 1 is a diagram showing an embodiment of the present invention in which a reference numeral 1 designates an engine, a numeral 2 an intake air tube, a numeral 3 an exhaust pipe, a numeral 4 a throttle valve, a numeral 5 an air cleaner, a numeral 6 a carman vortex type air flow sensor (hereinbelow referred to as an AFS), a numeral 7 a throttle sensor, a numeral 8 a crank angle sensor, a numeral 9 injectors, a numeral 10 a control section, numerals 11, 12 interfaces, numerals 13, 14 counters, a numeral 15 an A/D converter, a numeral 16 a CPU provided with an ROM and an RAM, numerals 17–21 timers and numerals 22–25 drivers.

In the above-mentioned construction, the AFS 6 detects an intake air quantity to the engine 1; the throttle sensor 7 detects the degree of opening of the throttle valve 4, and the crank angle sensor 8 generates a cylinder discriminating signal (SGC) and a crank angle reference signal (SGT). These signals detected are inputted in the control section 10 to actuate each of the injectors 9.

The operation of the first embodiment having the above-mentioned construction will be described with reference to a flow chart in FIG. 4.

Figure 4A:
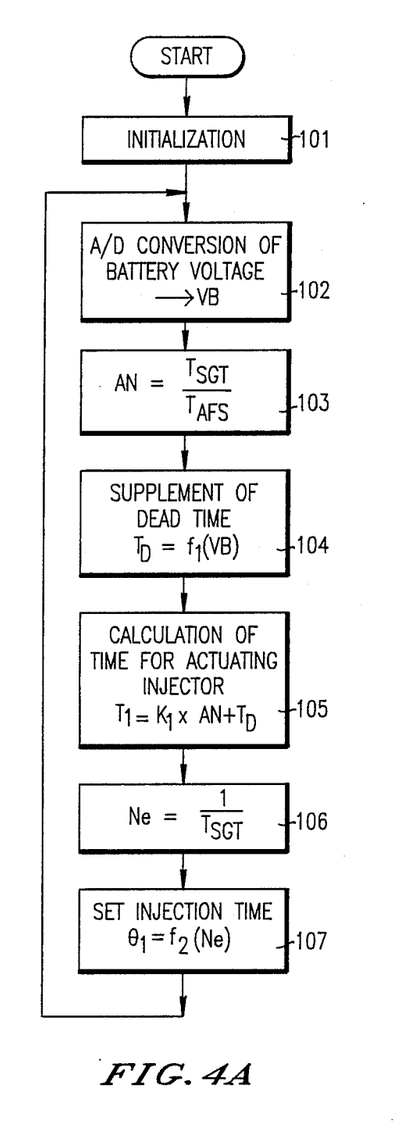
Figure 5:
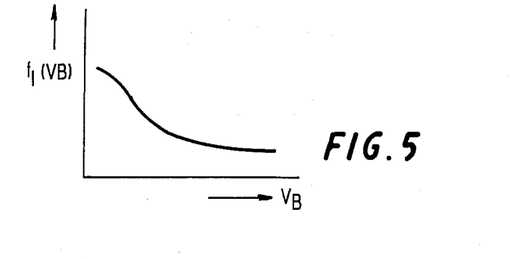
FIG. 5 is a characteristic diagram concerning dead time in fuel injection applicable to the operation of the present invention.
Figure 6:
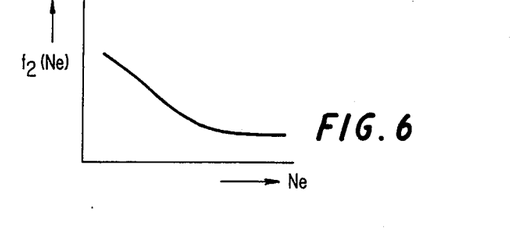
FIG. 6 is a characteristic diagram concerning an angle for initiating fuel injection which is applicable to the operation of the present invention.

In FIG. 4A, initialization is carried out at Step 101. At step 102, a battery voltage is subjected to an A/D conversion and then, stored in the RAM as VB. At Step 103, calculation of $AN = T_{SGT}/T_{AFS}$ is carried out on the basis of the period $T_{SGT}$ of the cylinder discriminating signal (SGC) and the period $T_{AFS}$ of the crank angle reference signal (AFS), wherein AN indicates a quantity of intake air sucked in a period of predetermined crank angle (i.e. a quantity of intake air sucked during a stroke operation). At Step 104, a dead time $T_D$ corresponding to the battery voltage VB is calculated on the basis of the characteristic diagram of FIG. 5. At Step 105, a time $T_I$ for actuating an injector is calculated on the basis of $T_I = K_I \times AN + T_D$, where $K_I$ is a conversion coefficient for an actuating time. At Step 106, an engine revolution number Ne is calculated on the basis of $Ne = 1/T_{SGT}$. At Step 107, a crank angle $\theta_1$ with respect to the revolution number Ne is determined on the basis of the diagram of FIG. 6. Namely, $\theta_1$ is the crank angle from a rising time of the crank angle reference signal SGT to the time of starting fuel injection. Upon completion of the operation at Step 107, the sequential operation is returned to Step 102.

Figure 4B:
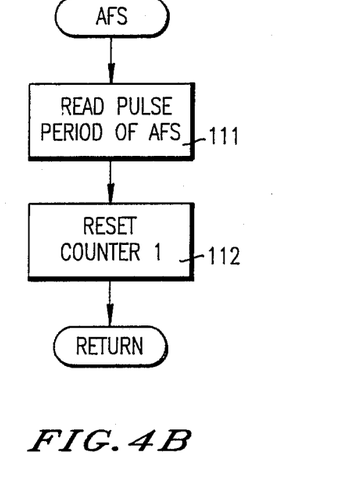

FIG. 4B shows an interruption routine at an input port $P_1$ in the CPU 16. At Step 111, a pulse period $T_{AFS}$ of the AFS 6 is read and at Step 112, a counter 13 for measuring the pulse period $T_{AFS}$ is reset.

Figures 4C, 4D:
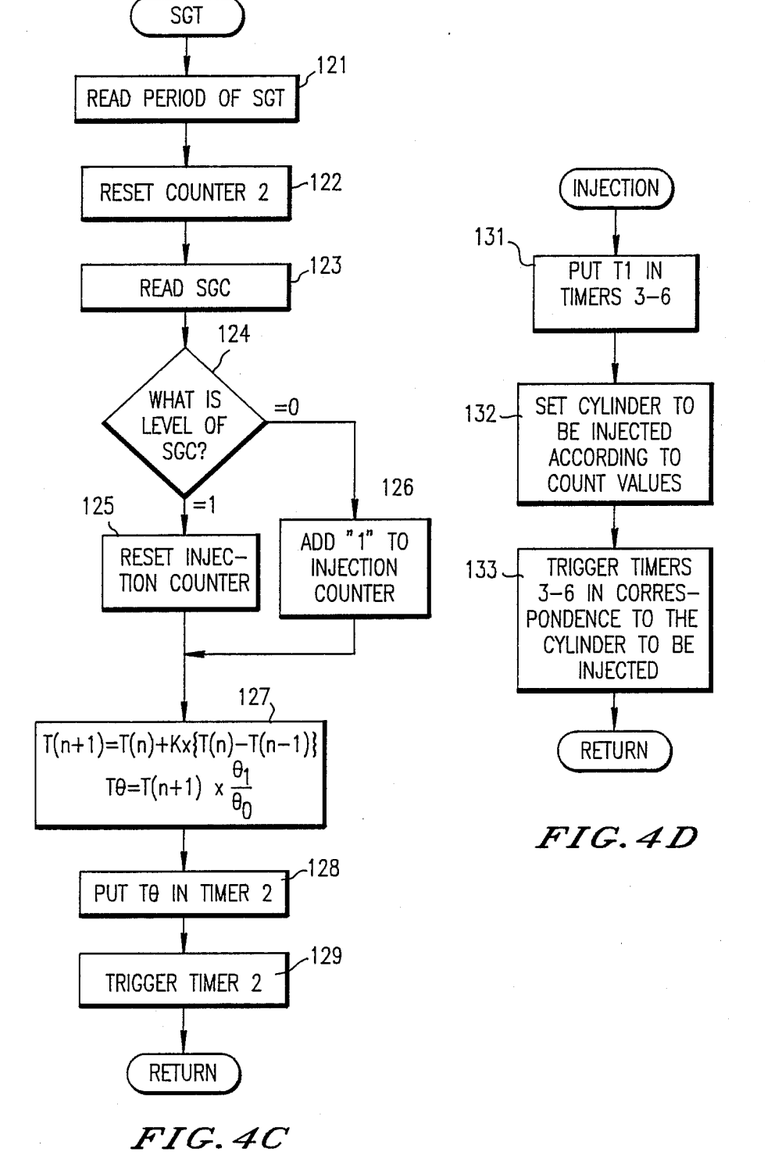

FIG. 4C shows an interruption routine at an input port $P_3$ in the CPU 16. At Step 121, the period $T_{SGT}$ of the crank angle reference signal is read, and at Step 122, a counter 14 for measuring the period $T_{SGT}$ is reset. At Step 123, the cylinder discriminating signal SGC is read. At Step 124, determination is made as to whether the level of the signal SGC is high or low. When the level of the signal SGC is high, i.e. "1", then, Step 125 is taken at which an injection counter provided in the CPU 16 is reset. When the level of the signal SGC is low, i.e. "0", the injection counter is added with "1". At Step 127 calculation of $T(n+1) = T(n) + K \times \{T(n) - T(n-1)\}$ is carried out.

Figure 7:
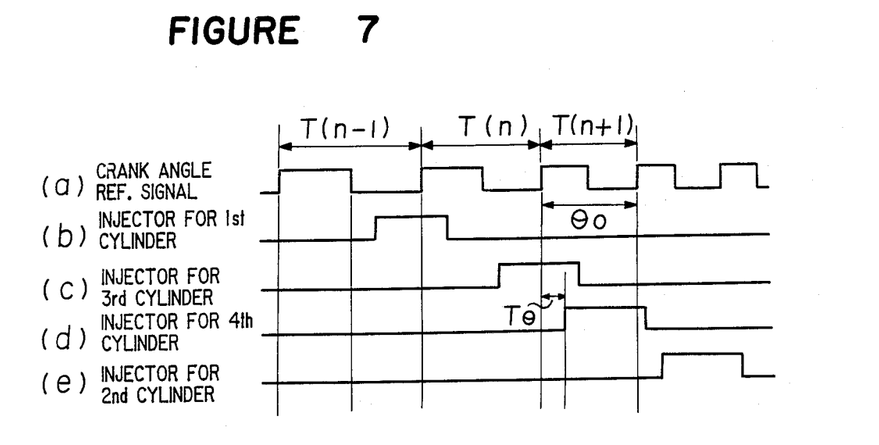
FIGS. 7, a–e are a timing chart for actuating injectors at the time of acceleration for the first embodiment of the present invention.

In FIG. 7, a character represents the waveform of the crank angle reference signal SGT, and characters b–e respectively represent timings of fuel injection for each of the first, third, fourth and second cylinders in the order of the igniting operation.

$T(n-1)$ indicates the previous period of the cylinder discriminating signal SGT; $T(n)$ indicates the present period; $T(n+1)$ indicates the next period, and K is a constant. By adjusting the magnitude of the value of K, a time for starting fuel injection can be shortened. At Step 127, calculation of $T\theta = T(n+1) \times \theta_1/\theta_0$ is also carried out, where $\theta_1$ is a crank angle from a rising time of the cylinder discriminating signal SGT to a time for starting fuel injection, $\theta_0$ is the crank angle of a one cycle period in the signal SGT which is 180°, and $T\theta$ is a time from the rising part of the signal SGT to starting the fuel injection. Accordingly, a time for starting fuel injection is shortened at the time of the acceleration of the automobile, and therefore, fuel injection is finished within the intake stroke for each of the cylinders. At Step 128, $T\theta$ is set in a timer 21, and at Step 129, the timer 21 is triggered.

FIG. 4D shows an interruption routine for an input port $P_6$ in the CPU 16. At Step 131, a time $T_1$ for actuating the injectors 9 is set in the timers 18–20. At Step 132, the cylinders to be injected are determined depending on counted values "0", "1", "2" and "3" in the counters (the value of count does not take a numerical valve of 4 since the SGC takes place once in four times of pulse in the SGT). At Step 133, the timers 17–20 are triggered to carry out fuel injection for the corresponding cylinders. The fuel injection is carried out in the injection time $T_1$ and at the injection starting timing $T_\theta$ on the basis of the signal SGT.

Figure 8:
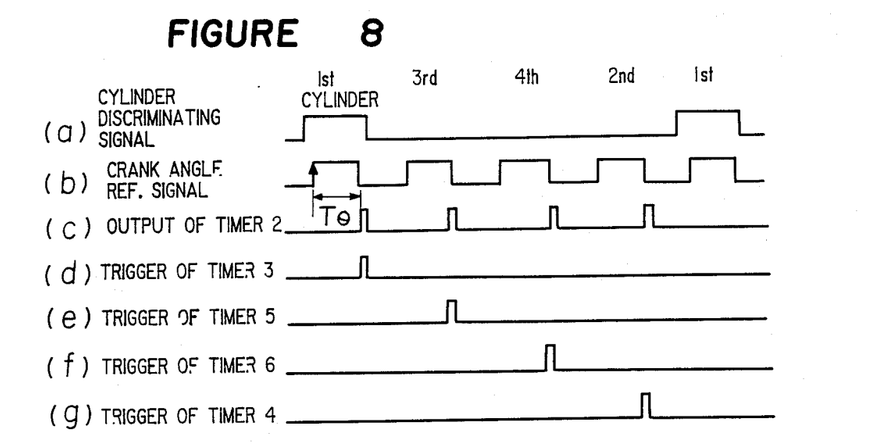
FIGS. 8, a–g are a timing chart for initiating fuel injection for each of the cylinders of the first embodiment of the present invention.

In FIG. 8, a character represents the output of the cylinder discriminating signal SGC, a character b represents the output of the crank angle reference signal SGT and a character c represents the output of the timer 21. The fuel injection starting timing $T_\theta$ is determined on the basis of these outputs. Characters d–g respectively represent trigger signals generated from the timers 17, 19, 20, 18 which effects the distribution of the output of the timer 21 in this order.

Figure 3:
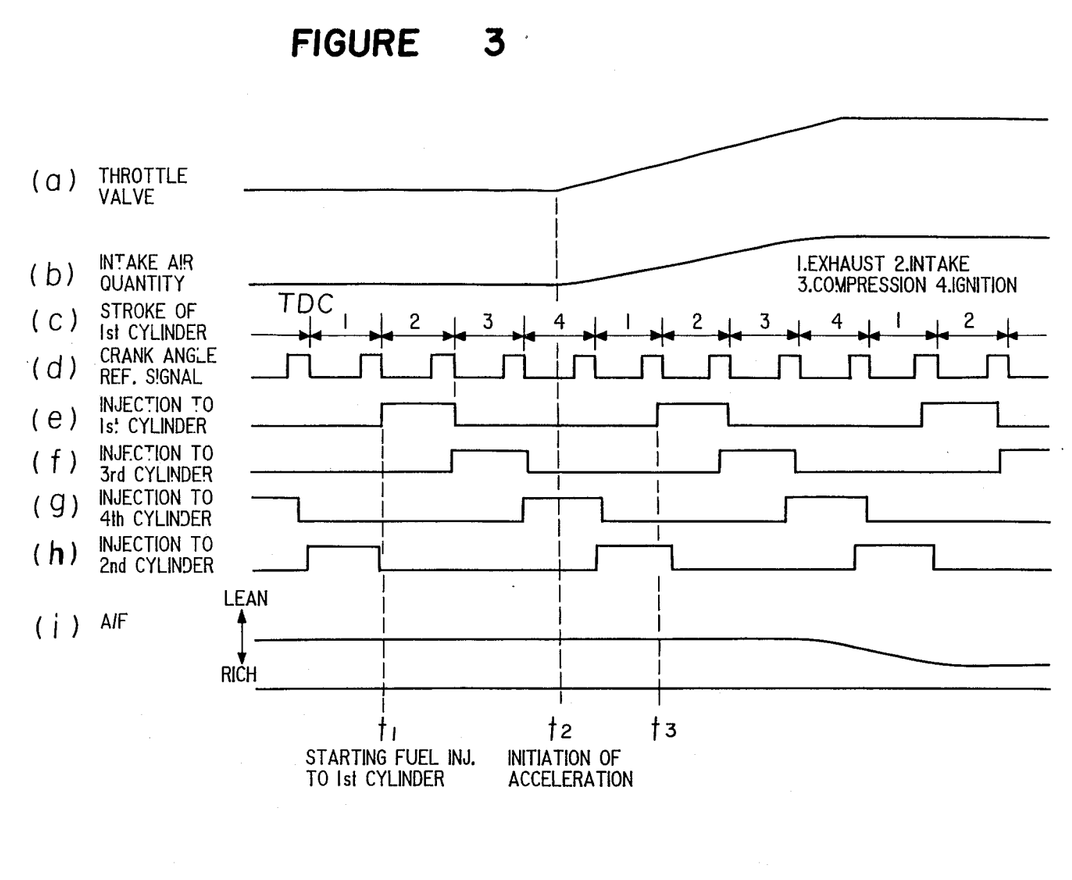
FIGS. 3, a–i are a timing chart showing the operation of the first embodiment of the present invention.

FIG. 3 is a timing chart for the first embodiment which corresponds to that in FIG. 2. As shown in FIG. 3, the time of finishing the fuel injection can be within intake strokes since the time of starting fuel injection at the time of the acceleration is shortened.

As described above, in accordance with the first embodiment of the present invention, the next period is obtained on the basis of the previous and present periods in the crank angle signal, and the fuel injection starting timing is controlled in accordance with the thus obtained next period. The next period is shortened at the time of the acceleration to thereby accelerate the fuel ignition starting timing, and the timing of finishing the fuel injection is within the intake stroke for the engine. Therefore, fuel injected is entirely sucked in the engine to render an air-fuel ratio to be proper to thereby increase engine acceleration performance.

A second embodiment of the fuel control apparatus for an internal combustion engine will be described. The construction of the second embodiment is the same as that of the first embodiment shown in FIG. 1, but its operation is different from the first embodiment.

The operation of the second embodiment will be described with reference to FIG. 9.

Figure 9A:
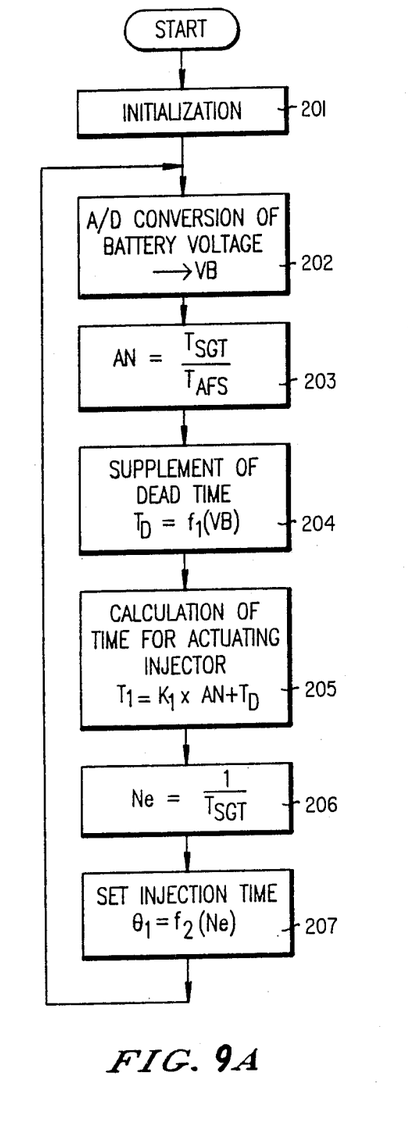
Figure 9B:
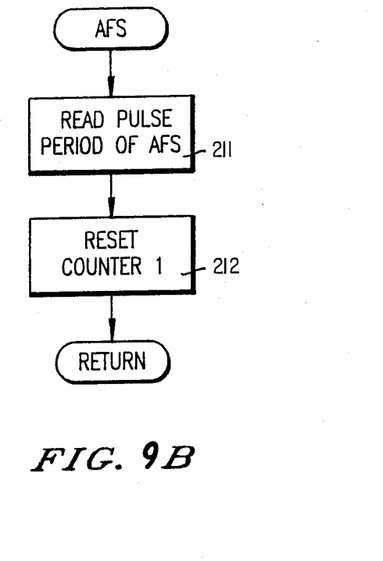

In flow charts shown in FIGS. 9A and 9B, Steps 201–207 and Steps 211–212 are respectively the same as the Steps 101–107 and the Steps 111–112 of the flow charts in FIGS. 4A and 4B. In flow charts shown in FIGS. 9C and 9D, Steps 221–229 and Step 242–244 are the same as the Steps 121–129 and the Steps 131–133 in FIGS. 4c and 4d. Therefore, description of these Steps is omitted.

Figures 9C, 9D:
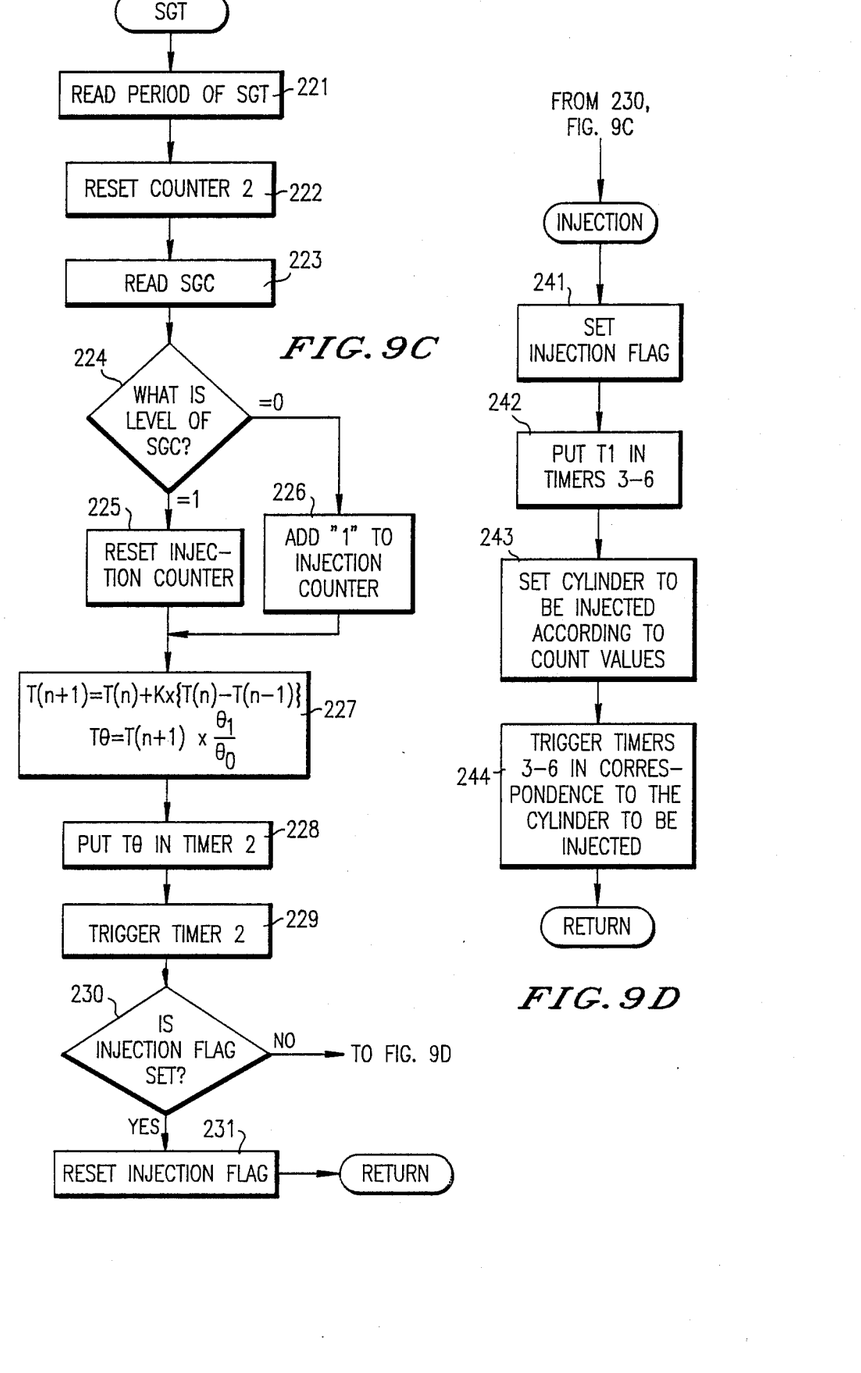
Figure 10:
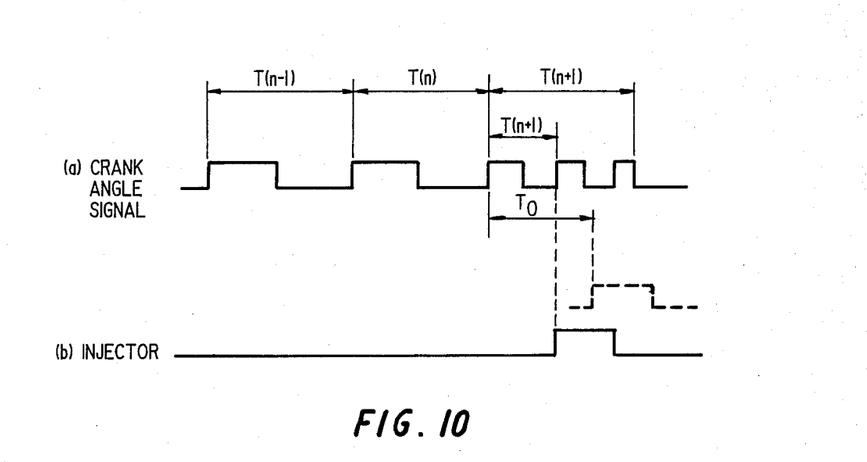
FIGS. 10, a and b are a timing chart at the time of the acceleration of the engine in the second embodiment of the present invention.

At Step 230, determination is made as to whether or not an injection flag is set. When it is set, Step 231 is taken to reset the injection flag to finish the interruption routine. When the injection flag is not set at Step 230, the sequential operation goes to Step 241 as shown in FIG. 9D. When a sudden acceleration is caused in the engine, or the number of revolution is greatly fluctuated, the period $T(n+1)$ of the crank angle signal which is estimated by calculation is far behind the actual value $T(n+1)'$ as shown in FIG. 10. In this case, the injection starting timing $T_\theta$ is also delayed so that the fuel injection is not carried out in the predetermined range of the crank angle. In this case, the fuel injection is carried out at the rising time of the next crank angle signal.

In an interruption routine for an input port $P_6$ in the CPU 16 as shown in FIG. 9d, the injection flag is set at Step 241, and the operations of Step 242 through Step 244 are carried out in the same manner as those of Step 131-133 in FIG. 4D.

Timing charts in determination of ignition timing for each of the cylinders in the second embodiment are the same as those described in FIGS. 7, 8 and 3 which are obtained in the first embodiment of the present invention.

The second embodiment of the present invention eliminates the problem of delayed the fuel injection which is caused by the fact that a calculated value for the next period of the crank angle signal is greater than the actual value at the time of a sudden acceleration of the engine. Namely, the fuel injection is carried out by the next-coming crank angle signal by detecting the fact that there is no fuel injection in a predetermined range of crank angle. The second embodiment also performs the same function and effect as obtainable in the first embodiment.

Figure 11:
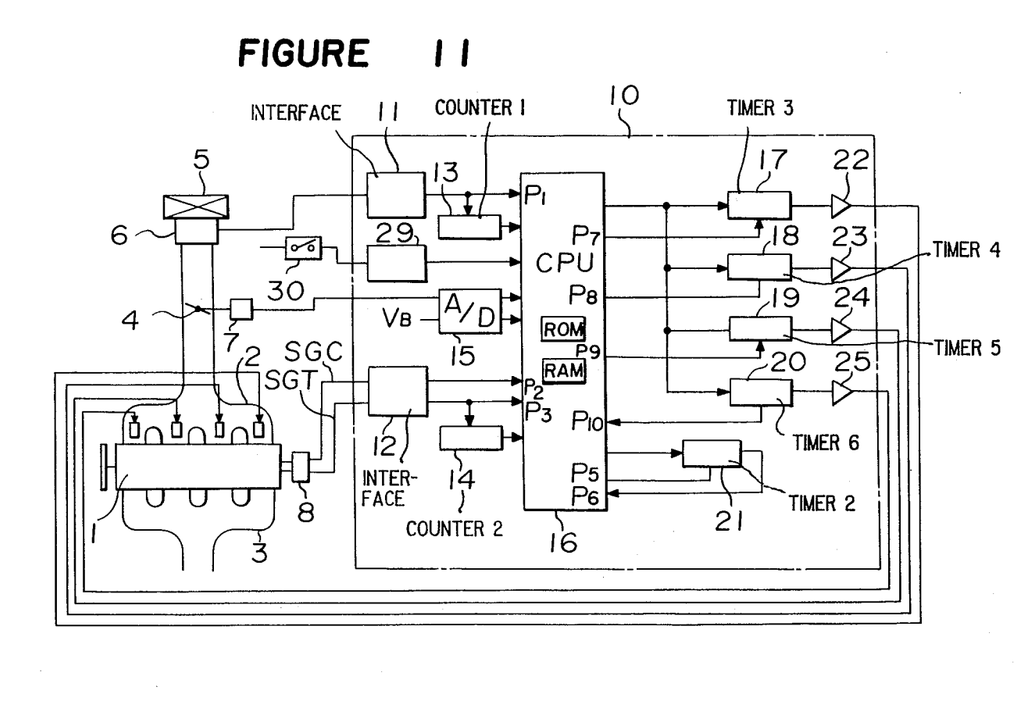
FIG. 11 is a diagram showing a third embodiment of the fuel control apparatus according to the present invention.

FIG. 11 is a diagram showing a third embodiment of the fuel control apparatus according to the present invention. The construction of the third embodiment is the same as the first and second embodiments except that a starter switch 30 for detecting starting of the engine is connected to the CPU 16 through an interface 29. Accordingly, description of the parts having the same reference numerals is omitted.

The operation of the third embodiment having the construction as shown in FIG. 11 will be described with reference to FIGS. 12A-12D.

Figure 12A:
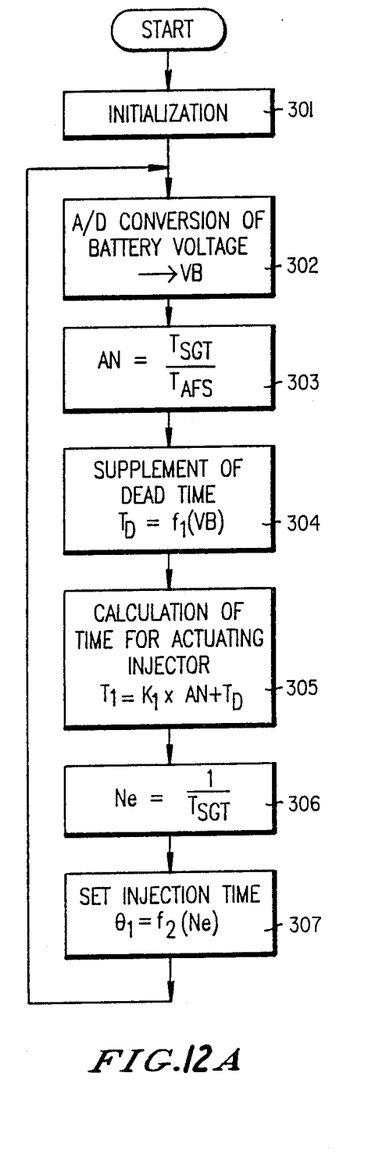
Figure 12B:
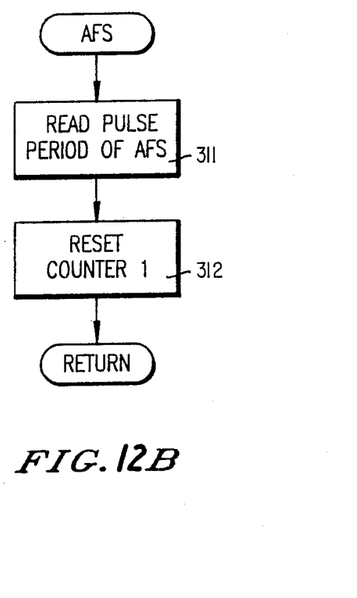
Figures 12C, 12D:
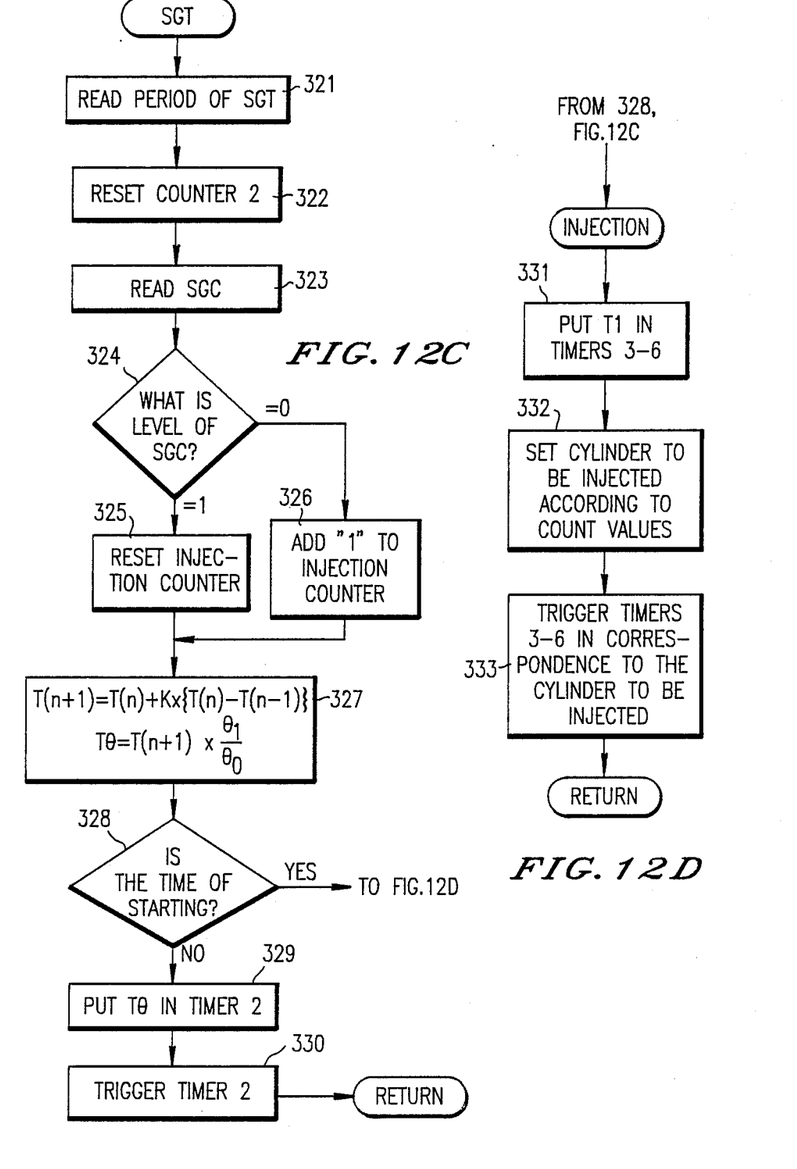

In flow charts shown in FIGS. 12A and 12B, Steps 301-307 and Steps 311-312 are respectively the same as Steps 101-107 and Steps 111-112 as shown in the flow charts in FIGS. 4A and 4B. In flow charts as shown in FIG. 12C and 12D, Steps 321-327 and Steps 329-333 are respectively the same as Steps 121-127 and Steps 128-133 in FIGS. 4C and 4D. Accordingly, description of these Steps is omitted.

Figure 13:
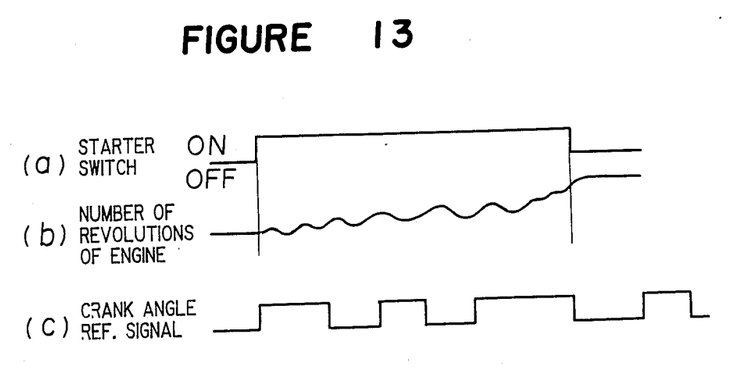
FIGS. 13, a–c are a timing chart in the third embodiment of the present invention.
Figure 14:
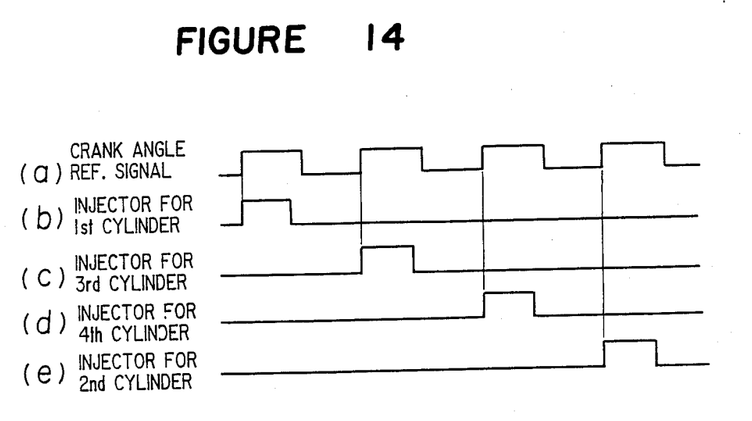
FIGS. 14, a–e are a timing chart for actuating injectors at the time of the acceleration in the third embodiment of the present invention.

At Step 328, determination is made as to whether or not the engine is at the time of starting. When the engine is not at the time of starting, a value $T_\theta$ calculated in the same manner as the first embodiment is set in the timer 21 at Step 329, and the timer 21 is triggered at Step 330. On the other hand, when the engine is started, Step 331 in FIG. 12D is taken. Namely, the starter switch 30 is turned on at the time of starting of the engine as shown in FIG. 13. At the moment, the revolution of the engine is increased while it shows a violent variation as shown in FIG. 13b. Accordingly, the crank angle reference signal SGT produced depending on the number of revolution of the engine becomes unstable as shown in FIG. 13c, whereby the next period $T(n+1)$ to be estimated from the previous period $T(n-1)$ and the present period $T(n)$ becomes also unstable, and therefore, timing of initiating fuel injection also becomes unstable. In the third embodiment of the present invention, therefore, the fuel injection for each of the cylinders is carried out so as to meet timings in the crank angle reference signal SGT at the time of starting of the engine as shown in FIG. 14.

Timing charts for fuel injection to each of the cylinders in the third embodiment of the present invention are the same as those shown in FIGS. 7, 8 and 3 for the first embodiment.

The third embodiment of the present invention provides good starting properties in addition to the function and effect as obtainable in the first embodiment. Namely, the fuel injection is started in synchronism with the crank angle signal at the time of starting of the engine.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel control apparatus for an internal combustion engine comprising an crank angle sensor producing a crank angle signal at a predetermined crank angle in said engine, an intake air quantity detecting means for detecting the quantity of intake air sucked in the engine, an injector for injecting fuel to an engine cylinder, and a control means for actuating the injector at a driving time in response to the quantity of intake air and at a timing determined by the crank angle signal, said fuel control apparatus being characterized by comprising a period calculating means for calculating the next period on the basis of the previous period and the present period in the crank angle signal and an injection-initiating time control means for controlling time to actuate the injector in accordance with the next period of the crank angle signal.

2. The fuel control apparatus according to claim 1, which further comprises a judging means for judging whether or not a fuel injection is carried out in a predetermined range of the crank angle, and means for causing fuel injection by the next crank angle signal when there is carried out no fuel injection in the predetermined range of the crank angle.

3. The fuel control apparatus according to claims 1 or 2, wherein $T(n+1)$ is calculated by using $T(n+1)=T(n)+K\{T(n)-T(n-1)\}$ where $T(n-1)$ is a previous period, $T(n)$ is a present period, $T(n+1)$ is a next period and K is a constant, and $T_\theta$ is calculated by $T_\theta = T(n+1) \times \theta_1/\theta_0$ where $\theta_0$ is a period of crank angle, $\theta_1$ is a crank angle from a reference position to an injection-initiating time and $T_\theta$ is a time from the reference position to the injection-initiating time.

4. A fuel control apparatus for an internal combustion engine comprising an crank angle sensor producing a crank angle signal at a predetermined crank angle in said engine, an intake air quantity detecting means for detecting the quantity of intake air sucked in the engine, an injector for injecting fuel to an engine cylinder, and a control means for actuating the injector at a driving time in response to the quantity of intake air and at a timing determined by the crank angle signal, said fuel control apparatus being characterized by comprising a period calculating means for calculating the next period on the basis of the previous period and the present period in the crank angle signal, a starting condition detecting means for detecting starting condition in the engine, and an injection-initiating time control means for controlling time to actuate the injector in synchronism with the crank angle signal in the time of starting the engine and in accordance with the next period of the crank angle signal in the time other than the starting time.

5. The fuel control apparatus according to claim 4, wherein $T(n+1)$ is calculated by using $T(n+1) = T(n) + K\{T(n) - T(n-1)\}$ where $T(n-1)$ is a previous period, $T(n)$ is a present period, $T(n+1)$ is a next period and $K$ is a constant, and $T_\theta$ is calculated by $T_\theta = T(n+1) \times \theta_1/\theta_0$ where $\theta_0$ is a period of crank angle, $\theta_1$ is a crank angle from a reference position to an injection-initiating time and $T_\theta$ is a time from the reference position to the injection-initiating time.

* * * * *